(12) United States Patent
Regni et al.

(10) Patent No.: US 9,311,135 B2
(45) Date of Patent: Apr. 12, 2016

(54) METHOD FOR GENERATING UNIVERSAL OBJECTS IDENTIFIERS IN DISTRIBUTED MULTI-PURPOSE STORAGE SYSTEMS

(75) Inventors: Giorgio Regni, Paris (FR); Vianney Rancurel, La Frette sur Seine (FR); Alain Tauch, Montrouge (FR); Benoit Artuso, Maisons Lafitte (FR); Jonathan Gramain, Paris (FR); Bertrand Demiddelaer, Lavallois-Perret (FR)

(73) Assignee: SCALITY, S.A., Paris (FR)

( * ) Notice: Subject to any disclaimer, the term of this patent is extended or adjusted under 35 U.S.C. 154(b) by 616 days.

(21) Appl. No.: 13/008,390

(22) Filed: Jan. 18, 2011

(65) Prior Publication Data

US 2012/0185555 A1 Jul. 19, 2012

(51) Int. Cl.
*G06F 15/16* (2006.01)
*G06F 9/46* (2006.01)
*G06F 17/30* (2006.01)
*H04L 29/08* (2006.01)

(52) U.S. Cl.
CPC .......... *G06F 9/465* (2013.01); *G06F 17/30097* (2013.01); *G06F 2209/463* (2013.01); *H04L 67/1097* (2013.01)

(58) Field of Classification Search
None
See application file for complete search history.

(56) References Cited

U.S. PATENT DOCUMENTS

| 5,365,587 | A  | 11/1994 | Campbell       |
|-----------|----|---------|----------------|
| 5,708,715 | A  | 1/1998  | Vicard         |
| 7,346,705 | B2 | 3/2008  | Hullot         |
| 7,383,291 | B2 | 6/2008  | Guiheneuf      |
| 7,437,516 | B2 | 10/2008 | Wintergerst et al. |
| 7,451,275 | B2 | 11/2008 | Petev et al.   |
| 7,457,918 | B2 | 11/2008 | Marwinski et al. |
| 7,469,319 | B2 | 12/2008 | Marwinski et al. |
| 7,493,449 | B2 | 2/2009  | Marwinski et al. |
| 7,512,737 | B2 | 3/2009  | Petev et al.   |
| 7,516,277 | B2 | 4/2009  | Kilian et al.  |
| 7,522,284 | B2 | 4/2009  | Sanders et al. |
| 7,539,821 | B2 | 5/2009  | Petev et al.   |
| 7,546,593 | B2 | 6/2009  | Petev et al.   |
| 7,552,284 | B2 | 6/2009  | Petev et al.   |
| 7,581,066 | B2 | 8/2009  | Marwinski et al. |

(Continued)

FOREIGN PATENT DOCUMENTS

WO      WO 01/13278 A2      2/2001
WO      WO 2010036754 A1      4/2010

OTHER PUBLICATIONS

Stoica, Ion, et al., "Chord: A Scalable Peer-to-peer Lookup Service for Internet Applications", SIGCOMM'01, Aug. 27-31, 2001, 12 pages.

*Primary Examiner* — Scott B Christensen
(74) *Attorney, Agent, or Firm* — Blakely Sokoloff Taylor & Zafman LLP

(57) ABSTRACT

A computer implemented method and system for generating secure universal object identifiers on a multipurpose storage system is disclosed. According to one embodiment, a system comprises a client system in communication with a network. An application server is in communication with the network. A storage cluster is in communication with the network. The storage cluster has a plurality of storage nodes. The client system stores a data object via the application server. The application server generates an object identifier assigned to the data object. The application server stores the data object on a storage node of the plurality of storage nodes. The data object is moved to another application server without moving contents of the data object in the storage cluster.

16 Claims, 6 Drawing Sheets

(56) References Cited

U.S. PATENT DOCUMENTS

| | | |
|---|---|---|
| 7,590,672 B2 * | 9/2009 | Slik et al. |
| 7,653,828 B2 | 1/2010 | Kostadinov et al. |
| 7,694,065 B2 | 4/2010 | Petev et al. |
| 7,716,180 B2 * | 5/2010 | Vermeulen et al. ........... 707/626 |
| 7,822,713 B2 | 10/2010 | Hullott |
| 7,831,634 B2 | 11/2010 | Petev et al. |
| 7,840,760 B2 | 11/2010 | Petev et al. |
| 7,877,356 B1 | 1/2011 | Guiheneuf |
| 7,933,947 B2 | 4/2011 | Fleischer et al. |
| 7,971,001 B2 | 6/2011 | Petev et al. |
| 7,991,637 B1 | 8/2011 | Guiheneuf |
| 7,996,615 B2 | 8/2011 | Galchev et al. |
| 8,028,002 B2 | 9/2011 | Petev et al. |
| 8,429,444 B2 | 4/2013 | Rancurel et al. |
| 8,612,960 B2 | 12/2013 | Petev et al. |
| 2002/0049685 A1 | 4/2002 | Yaginuma |
| 2003/0195940 A1 | 10/2003 | Basu et al. |
| 2005/0114291 A1 | 5/2005 | Becker-Szendy et al. |
| 2005/0246393 A1 * | 11/2005 | Coates et al. ................. 707/200 |
| 2005/0262164 A1 | 11/2005 | Guiheneuf |
| 2006/0031587 A1 | 2/2006 | Paterson |
| 2006/0143386 A1 | 6/2006 | Marwinski |
| 2007/0039054 A1 | 2/2007 | Mulla |
| 2008/0065718 A1 | 3/2008 | Todd et al. |
| 2009/0282196 A1 | 11/2009 | Petev et al. |
| 2009/0282395 A1 | 11/2009 | Petev et al. |
| 2010/0023582 A1 * | 1/2010 | Pedersen et al. ............. 709/203 |
| 2010/0162035 A1 * | 6/2010 | Rancurel et al. .................. 714/4 |
| 2010/0268881 A1 | 10/2010 | Galchev et al. |
| 2010/0333116 A1 * | 12/2010 | Prahlad et al. ................ 719/328 |
| 2011/0138131 A1 | 6/2011 | Regni |
| 2011/0276656 A1 * | 11/2011 | Knapp et al. .................. 709/219 |

* cited by examiner

METHOD FOR GENERATING UNIVERSAL OBJECTS IDENTIFIERS IN DISTRIBUTED MULTI-PURPOSE STORAGE SYSTEMS

FIELD

The field of the invention relates generally to computer systems. In particular, the present method and system is directed to generating universal object identifiers in a distributed multi-purpose storage system.

BACKGROUND

Historically, an application's accumulated data was directly stored as named files on the local disks of the application computers. These files were stored in directories belonging to file hierarchies installed on the local disks. Now applications and storage need not reside on the same disks, nor on the same computer.

Moreover, historical naming conventions are not necessary any more, nor is it required to store files in directories. Files could be indexed with numbers (keys) in a database and an application with a specific connector (for example, using HTTP—Hypertext Transfer Protocol or any other suitable protocols) could fetch files directly to/from a key/value store.

The historical concept of a named file is no longer necessary for an application to access its accumulated data and this abstraction creates unnecessary overhead as handling a hierarchy of billions of files and folders proves to be complex.

SUMMARY

A computer implemented method and system for generating secure universal object identifiers on a multipurpose storage system is disclosed. According to one embodiment, a system comprises a client system in communication with a network. An application server is in communication with the network. A storage cluster is in communication with the network. The storage cluster has a plurality of storage nodes. The client system stores a data object via the application server. The application server generates an object identifier assigned to the data object. The application server stores the data object on a storage node of the plurality of storage nodes. The data object is moved to another application server without moving contents of the data object in the storage cluster.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the present embodiments.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles of the present embodiments.

Figure 1:
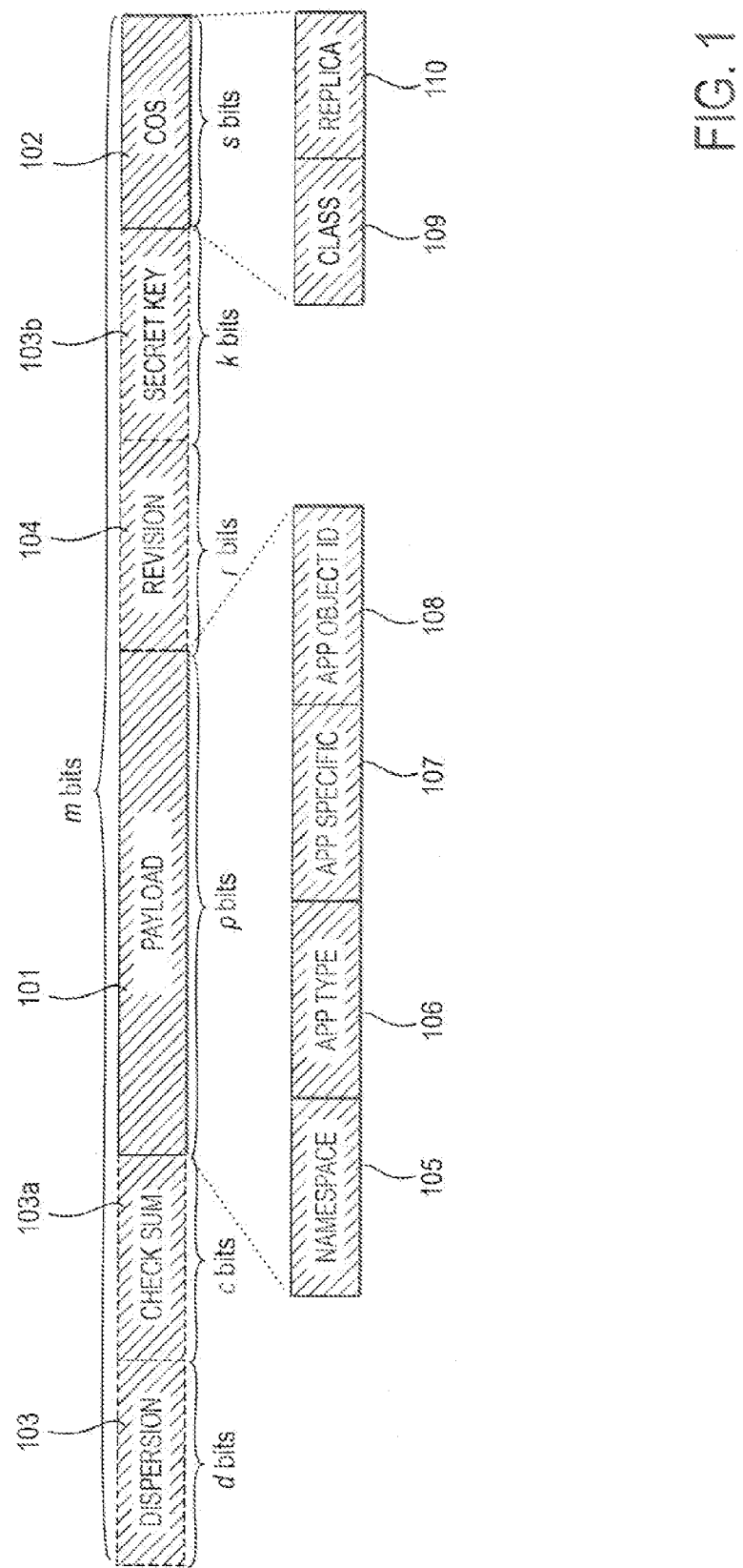
FIG. 1 illustrates an exemplary generic key layout, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

A computer implemented method and system for generating secure universal object identifiers on a multipurpose storage system is disclosed. According to one embodiment, a system comprises a client system in communication with a network. An application server is in communication with the network. A storage cluster is in communication with the network. The storage cluster has a plurality of storage nodes. The client system stores a data object via the application server. The application server generates an object identifier assigned to the data object. The application server stores the data object on a storage node of the plurality of storage nodes. The data object is moved to another application server without moving contents of the data object in the storage cluster.

Also a computer implemented method and system for generating secure universal object identifier keys to guarantee interoperability, ownership, identity and security on a multi-purpose storage system is disclosed.

Present methods of data identifiers applied to application data objects generally use common naming conventions which do not prevent confusion with other data objects associated with other applications especially in view of the emergence of cloud storage systems. Cloud storage systems present questions of interoperability, ownership and security of data objects stored on such systems. For this reason it is preferable to use the concept of object which is a set of data and metadata elements uniquely identified by a key. The present embodiments overcome these limitations by providing a method of generating object identifier keys to provide interoperability, ownership identity and security.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. A method is here, and generally, conceived to be a self-consistent process leading to a desired result. The process involves physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present method and system also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, hard disks or solid state flash disks or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the method and system as described herein.

FIG. 1 illustrates an exemplary embodiment of a key in which each object is assigned an identifier (or a key) M with a number of bits m. The key is composed of a payload P 101 and a class of service (COS) field S 102 of respectively p and s bits. Additional fields may be provided such as, a dispersion field D 103 of length d bits, a checksum field C 103a of length c bits, a revision field R 104 of length r, and a secret key K 103b of length k.

The class of service field contains information needed to route the key over the distributed system. It may contain a class number 109 and replica identifier 110. The class number defines e.g. the number of replicas for the key, or custom replications policies.

Replicas are copies of objects. They have also a unique identifier that can be computed by a mathematical formula or an algorithm from the given object identifier.

An embodiment of a class number definition is simply that the class number C is the number of replicas minus one. For example, class=0 means only one replica, class=1 means 2 replicas, for N>0 class class=N−1 defines N replicas. Computation of replica keys can be done by any algorithm that allows one to compute a replica $D_i$ from a replica $D_j$ and vice versa and facilitates rack aware and datacenter aware node key assignments.

Figure 2:
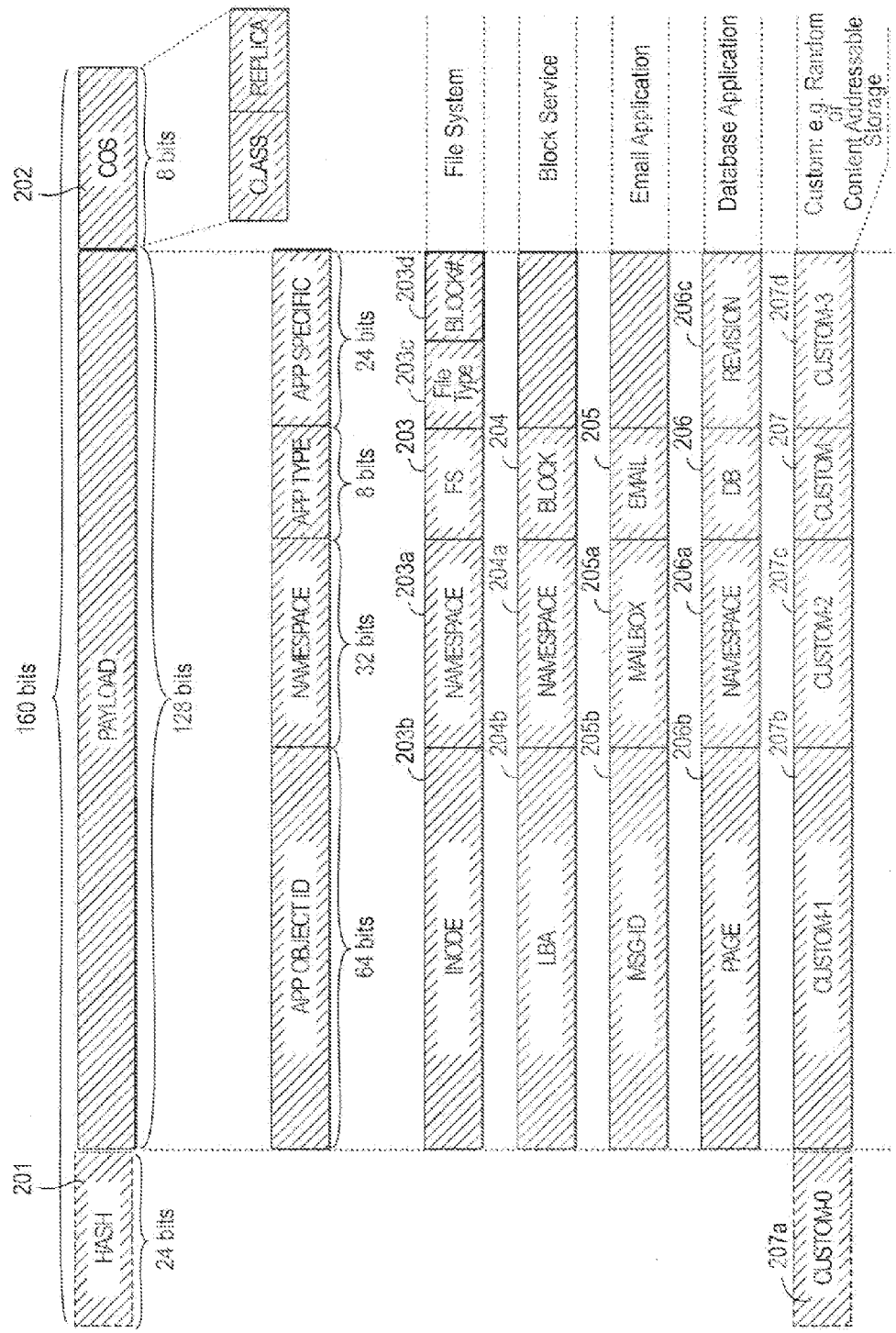
FIG. 2 illustrates an exemplary key layout for specific application types, according to one embodiment.

FIG. 2 illustrates another embodiment of a key layout. This key layout maps the previously described key layout to a practical 160 bit key layout and is described accurately thereafter.

First, verification, dispersion and non-guessability are implemented by employing a hash function and stored at the beginning of the key 201. Class of service information is the same as described before 202.

Application types could be any computer application such as a file system 203, a block service 204, a messaging system (email) 205, a database application 206, or any other custom application 207.

In the case of a file system application 203 the namespace 203a can be used to encode a specific volume identifier and/or a customer identifier, the application object identifier is commonly referred as the inode number 203b. Application specific information is the file type 203c (regular file, directory, symbolic link, special file, etc). And block number for files split in blocks 203d.

In the case of a block service 204, the namespace 204a can be used to encode a specific volume identifier and/or a customer identifier, the application object identifier is commonly referred as the LBA (Logical Block Number) 204b.

In the case of a messaging system 205, the namespace 205a can be used to encode the mailbox identifier, the application object identifier is commonly referred as the message identifier 205b.

In the case of a database application 206, the namespace 206a can be used to encode a specific volume identifier and/or a customer identifier. The application object identifier is commonly referred to as a page 206b. Application specific information needs to be a revision 206c.

It is possible to use those fields in a customized way 207. Customized object ID 207b, customized namespace 207c and customized application type 207d can be created. It is even possible to override the hash field 207a if the application ensures that it is correctly dispersed. The key layout offers 144 bits available entropy (160 minus mandatory class of service and minus application type fields).

With such entropy it is possible to embed random generated keys, checksum generated keys needed in Content Addressable Storage systems (CAS), or even normalized 128 bits UUID (Universal Unique Identifiers) allowing a variety of rich applications.

A previous application of describes a key/value store apparatus that allows a user to store, retrieve and delete objects bound to unique keys. Most users don't use directly such apparatuses but use authentication and application servers (e.g. webmails or web based file managers) to access their data.

It is the task of the authentication server to make the link between user identifier and application server. It is the task of the application server to make the link between the user identifier and the list of its objects. This is achieved by keeping a metadata for each object.

Metadata contains application specific information and augments the value of an object. A metadata could be described as any useful information that could be extracted from the object itself (e.g. indexes, key words, tags) and externally from envelope of the object (e.g. the creator of the object, the creation time, the access time, the attribute modification time, etc).

In the case of an e-mail message these metadata could be the sender, the subject of the message, the date of reception, the name of the folder containing the message, some user supplied tags, indexes that increase the search operations, and various other information fields. In the case of a file, these metadata could be the ACL—Access Control List, the folder, the UID—User Id and—Group Id, etc.

Metadata can also be administrative information such as a secret key as previously described.

The present invention comprises a method to identify objects (e.g. e-mails or files) in a way that they can be stored once at a final location, e.g. a storage node, and metadata needed to describe objects (attributes such as date of reception of messages, ACL, etc) can be moved transparently without moving the objects content.

Figure 3:
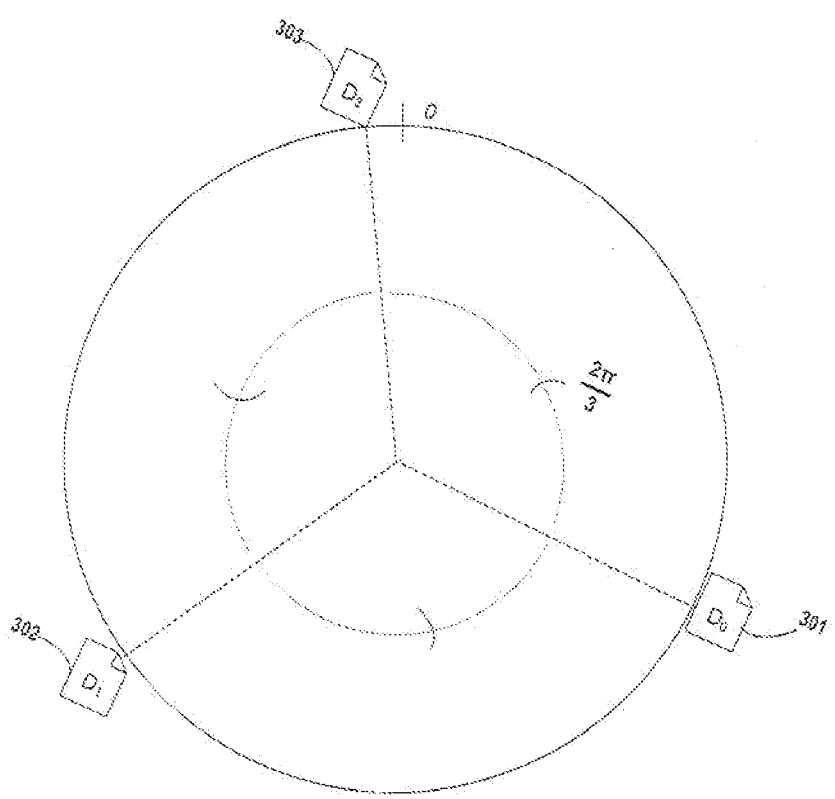
FIG. 3 illustrates an exemplary replica scheme, according to one embodiment.

FIG. 3 illustrates an embodiment of an object $D_0$ 301 of class=2 that has two other copies $D_1$ 302, $D_2$ 303. An embodiment of a replica key assignment is for a given dispersion $D_0$ to define its N>0 replicas as following: given the keyspace $2^m$, we define $D_i=(D_0+(2^m/(N-1)))$ mod $2^m$ that fills the dispersion field of the replica 0<=i<N with an accurate rounding rule.

Figure 4:
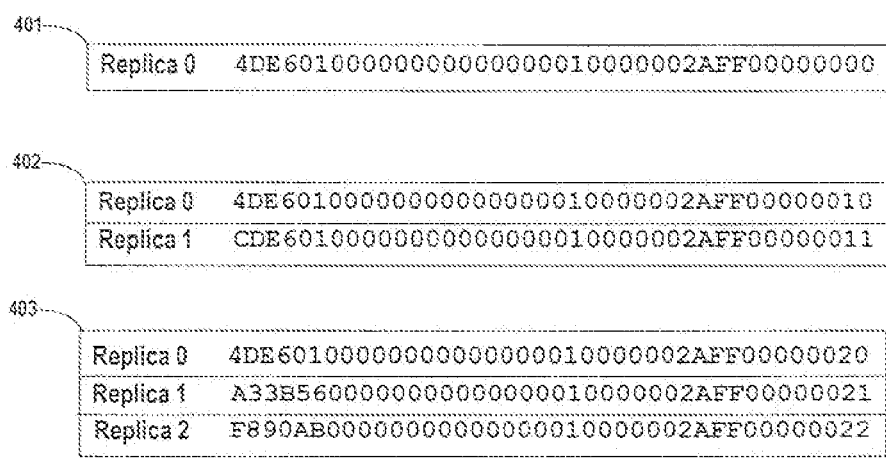
FIG. 4 illustrates an example of several keys and their computed replicas according to various classes of service, according to one embodiment.

FIG. 4 illustrates an embodiment of the key layout that conforms to the replica scheme, $D_i$. The object has namespace 0x2A, application type 0xFF, object identifier 0x1 and application specific 0x0. Key shown in 401 has class of service 0 (0 replica, 1 copy), key shown in 402 has class of service 1 (1 replica, 2 copies) and it is clearly shown the dispersion field vary for replica 0 and replica 1 with an angle of PI ($2^m/2$). Key shown in 403 has a class of service 2 (2 replicas, 3 copies) and it is clearly shown that the dispersion field varies for replica $D_0$ 301, $D_1$ 302 and $D_2$ 303 with an angle of $2*\pi/3$ ($2^m/3$).

An embodiment of a revision mechanism is composed of a numerical R field, initialized at first to 0, that is cooperatively incremented each time a new revision is requested by an application. By convention if the R field contains r bits, the highest deviation between two revisions cannot exceed $2^{r-1}$. Each deviation greater than this is considered as a rollover.

(P cat R) (read P "catenates" R) is the public information of the key (payload concatenated to revision), key self-verification field is filled by computing H(P cat R), a Hash function. Dispersion is defined inside or outside the key. In the first case it is computed once and is part of the key and in the second case it is computed at each routing decision of the key. The dispersion field is filled by computing H(P cat R) for replica 0 and using the formula disclosed above for replicas.

Non-guessability is implemented by using a Hash based Message Authentication Code (HMAC) algorithm. Let K be the secret key encoded or not into the identifier M, the non-guessability field is filled by computing H((K xor outer_pad) cat H((K xor inner_pad) cat P cat R)), outer_pad and inner_pad being the constant of a HMAC algorithm known in the art.

If the secret key is encoded into the identifier M then it acts as a salt. It must be random and different for each key so that it can prevent attackers from accessing resources if they know all the public information relative to an object. If the secret key is hidden then it has to be stored by an application, e.g. in a metadata.

Payload could be generalized as being composed of general information such as namespace, application type 106, application specific information 107, and application object identifiers 108. The possibility of storing the namespace in the key 106 is important in multi-tenant architectures to avoid any conflicts between different data owners. Each application could store specific bits 107 and one can make the assumption that each application will label each objects with unique identifiers 108.

Figure 5:
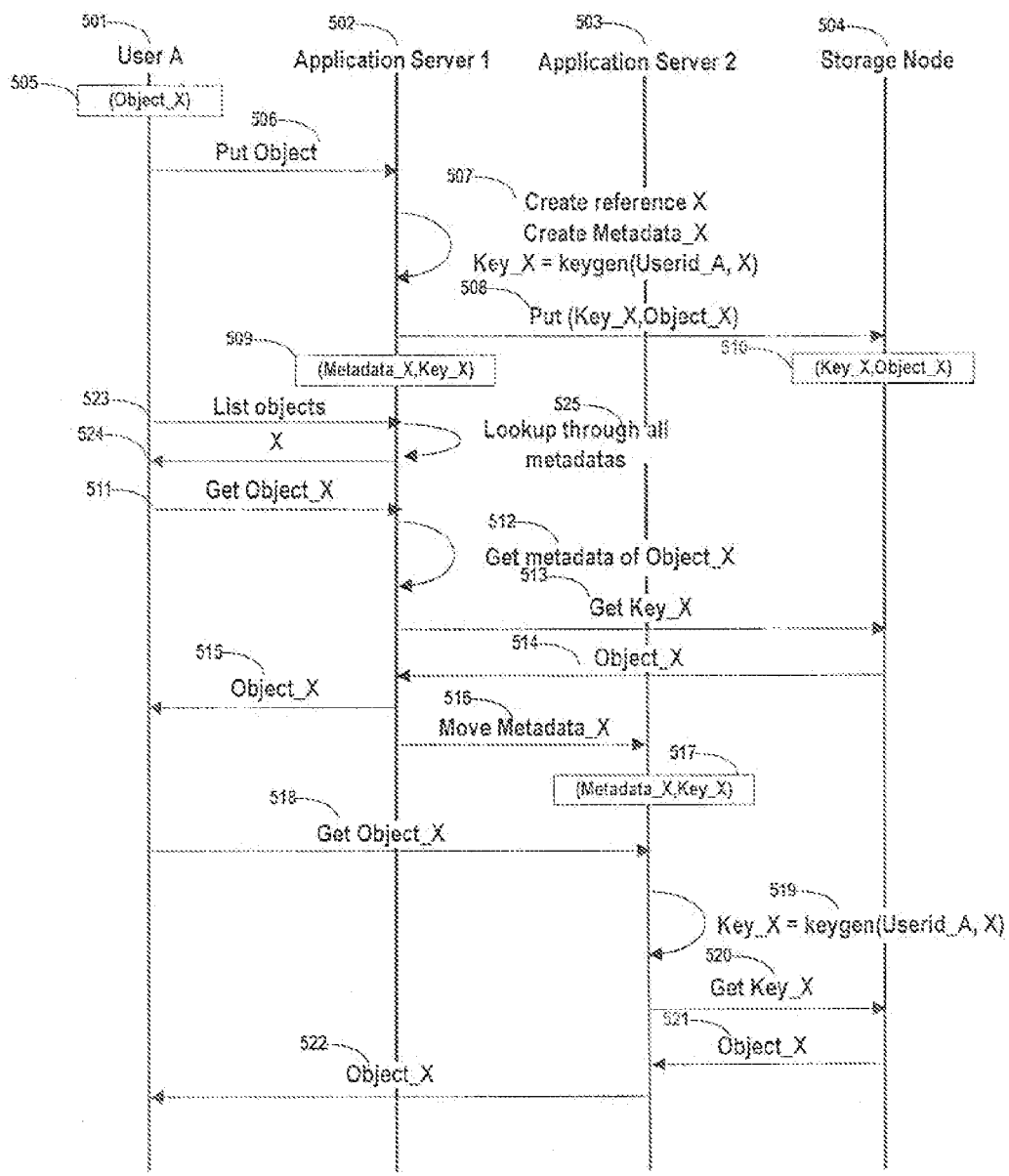
FIG. 5 illustrates an exemplary metadata movement between two application servers without moving the object content, according to one embodiment.

Referring to FIG. 5, User A 501 on a client system stores 506 an object 505 to an application/metadata server 502. The latter creates a reference X and a metadata for it 507, and generates a unique key from relevant properties of the object, typically the user identifier and the reference X or even from a random number. The reference is typically a unique object identifier within a mailbox, or a volume. The application server then stores the key and the data 508 to the storage node 504. The application can remove the object content from its local storage since it can retrieve it through the storage node 504 with the help of the key. The application server now needs only to maintain the metadata and the key of X 509. The storage node maintains the object content bound to the key of X 510.

The reference of X is generally hidden to the user or not explicitly shown, although it can be. The application generally provides user-friendly ways to list the objects of a given user, for example, graphically, as a web interface or as a database like SELECT statement, etc.

When the user wants to retrieve an object it sends a "list" operation 523 to the application server 502. The latter sends back the list of known objects through their metadata 525, generally stored in a database, where it sends back X 524. The user may now request the object 511. The application server gets the metadata and the key from the reference of the requested object X 512, and fetches the object content 514 with the key 513. It then sends the content 515 back to the user 501.

If for some reason, such as maintenance operations or load balancing, the metadata 516, 517 has to be moved on another application server 503, then when a user requests it, 518, and assuming that some redirect operation is done at user request, for example, by using a well known proxy server or HTTP and TCP redirect tricks, then in the same manner, the key could be regenerated 520 by the reference and user id information 519, and retrieved 521 for the same storage node 504, and finally sent back 522.

As a result only a very small amount of data, the metadata, is required to be moved when migrating an account through application servers. The object content that represents the most important and largest bytes of an object remains on the same storage node. This spares a lot of network bandwidth usage and prevents unnecessary read and write load to storage nodes and disks.

An embodiment of the present system is realized with mail servers accessing a cluster of storage nodes (e.g. distributed among a Consistent Hashing Ring, or using the algorithm Chord as an addressing mechanism). The user identifier in this case is the one used at account provisioning, that is mapped to user identifier in the previous apparatus description, and the message identifier is mapped to the reference X in the previous apparatus description.

Figure 6:
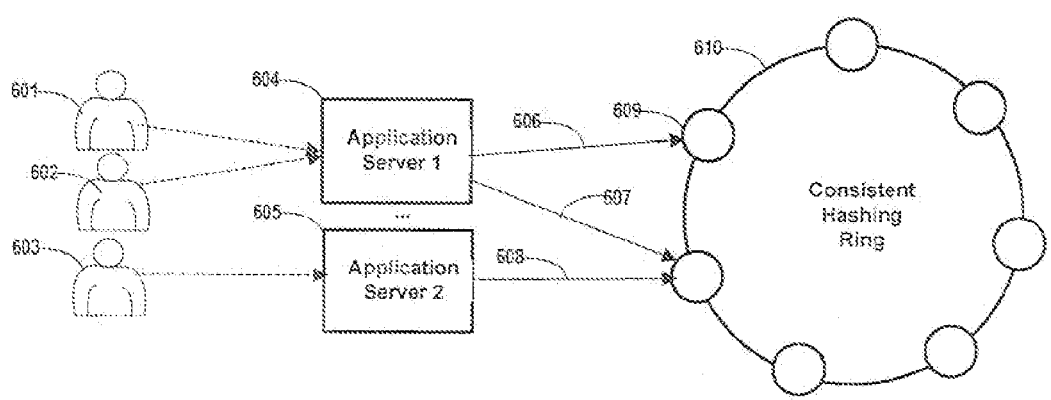
FIG. 6 illustrates an exemplary apparatus allowing users to access a distributed system through application servers, according to one embodiment.

FIG. 6 illustrates an embodiment of an apparatus that allows users 601, 602 and 603 to access a common distributed storage system (here a Consistent Hashing Ring or a Chord network) 610 through application servers 604 and 605. There is an affinity of users to application servers but their metadata can be moved through application servers without moving the data. Application servers access storage nodes 609 in a distributed fashion 606, 607 and 608. There is no single point of failure between application servers and storage nodes.

Various changes, modifications, variations, as well as other uses and applications of the subject invention may become apparent to those skilled in the art after considering this specification together with the accompanying drawings and claims. All such changes, modifications, variations, and other uses and applications which do not depart from the spirit and scope of the invention are intended to be covered hereby and limited only by the following claims.

We claim:

1. An apparatus, comprising:
an application server having a processor and a memory, said application server having an interface to couple to a distributed storage system that stores an object and replicas of the object, said application server to generate a key for the object or a replica of the object and pass the key through the interface, said application server comprising program code stored on a computer readable storage medium, said program code to cause the following method to be performed when executed by a processing unit of the application server:
structure the key to include a payload comprising an application object ID, a namespace, an application type and application specific information;
generate for inclusion into the key a dispersion field calculated as:
for a first instance of the object: a dispersion constant calculated as a hash of the payload and R where R is a revision value of the object that increments with each new revision of the object;
for the first and subsequent replicas of the object: a modulo operation that divides two terms, a first of the terms including a summation of the dispersion constant keyspace size term, said keyspace size term normalized by a term that increases with the number of replicas, a second of the terms being said keyspace size term;
generate for inclusion into the key a field identifying the number of replicas for the object;
generate for inclusion into the key a replica number specific to the key's associated object;
perform a hash of a secret key, the payload and R and incorporate the hash with the key;
wherein, upon the application server passing the key through the interface to the distributed data storage system, the distributed storage system proceeds to:
route the key through the distributed data storage system based on the field that identifies the number of replicas for the object and the replica number that is specific to the key's associated object;
access a keyspace location based on the dispersion field;
prevent unwanted access to the object by an entity that does not know the secret key.

2. The apparatus of claim 1 wherein said application server is also to generate a checksum for inclusion into said key.

3. The apparatus of claim 1 wherein said payload can be mapped to any of the following types: file system; block service; email application; database application.

4. The apparatus of claim 1 wherein said network is a Chord network.

5. An apparatus, comprising:
a distributed storage system; and,
an application server having a processor and a memory, the application server having an interface to couple to the distributed storage system that stores an object and replicas of the object, said application server to generate a key for the object or a replica of the object and pass the key through the interface, said application server comprising program code stored on a computer readable storage medium, said program code to cause the following method to be performed when executed by a processing unit of the application server:
structure the key to include a payload comprising an application object ID, a namespace, an application type and application specific information;
generate for inclusion into the key a dispersion field calculated as:
for a first instance of the object: a dispersion constant calculated as a hash of the payload and R where R is a revision value of the object that increments with each new revision of the object;
for the first and subsequent replicas of the object: a modulo operation that divides two terms, a first of the terms including a summation of the dispersion constant keyspace size term, said keyspace size term normalized by a term that increases with the number of replicas, a second of the terms being said keyspace size term;
generate for inclusion into the key a field identifying the number of replicas for the object;
generate for inclusion into the key a replica number specific to the key's associated object;
perform a hash of a secret key, the payload and R and incorporate the hash with the key;
wherein, upon the application server passing the key through the interface to the distributed data storage system, the distributed storage system proceeds to:
route the key through the distributed data storage system based on the field that identifies the number of replicas for the object and the replica number that is specific to the key's object;
access a keyspace location based on the dispersion field;
prevent unwanted access to the object by an entity that does not know the secret key.

6. The apparatus of claim 5 wherein said application server is also to generate a checksum for inclusion into said key.

7. The apparatus of claim 5 wherein said payload can be mapped to any of the following types: file system; block service; email application; database application.

8. The apparatus of claim 5 wherein said network is a Chord network.

9. A non-transitory machine readable storage medium having stored thereon program code that when processed by a processing unit of a computing system causes the computing system to perform a method, comprising:
structuring the key to include a payload comprising an application object ID, a namespace, an application type and application specific information, the key for accessing an object from a distributed object storage system that stores the object and replicas of the object;
generating for inclusion into the key a dispersion field calculated as:
for a first instance of the object: a dispersion constant calculated as a hash of the payload and R where R is a revision value of the object that increments with each new revision of the object;
for the first and subsequent replicas of the object: a modulo operation that divides two terms, a first of the terms including a summation of the dispersion constant keyspace size term, said keyspace size term normalized by a term that increases with the number of replicas, a second of the terms being said keyspace size term;
generating for inclusion into the key a field identifying the number of replicas for the object;
generating for inclusion into the key a replica number specific to the key's associated object;

performing a hash of a secret key, the payload and R and incorporate the hash with the key;

forwarding the key toward an interface to the distributed data storage system wherein unwanted access to the object is prevented by an entity that does not know the secret key.

10. The non-transitory machine readable storage medium of claim 9 wherein said application server is also to generate a checksum for inclusion into said key.

11. The non-transitory machine readable storage medium of claim 9 wherein said payload can be mapped to any of the following types: file system; block service; email application; database application.

12. The non-transitory machine readable storage medium of claim 9 wherein said network is a Chord network.

13. A method, comprising:
structuring a key to include a payload comprising an application object ID, a namespace, an application type and application specific information, the key for accessing an object or a replica of the object from a distributed object storage system that stores the object and replicas of the object;
generating for inclusion into the key a dispersion field calculated as:
for a first instance of the object: a dispersion constant calculated as a hash of the payload and R where R is a revision value of the object that increments with each new revision of the object;
for the first and subsequent replicas of the object: a modulo operation that divides two terms, a first of the terms including a summation of the dispersion constant and a keyspace size term, said keyspace size term normalized by a term that increases with the number of replicas, a second of the terms being said keyspace size term;
generating for inclusion into the key a field identifying the number of replicas for the object;
generating for inclusion into the key a replica number specific to the key's associated object;
performing a hash of a secret key, the payload and R and incorporate the hash with the key; and,
forwarding the key toward an interface to the distributed data storage system wherein unwanted access to the object is prevented by an entity that does not know the secret key.

14. The method of claim 9 wherein said application server is also to generate a checksum for inclusion into said key.

15. The method of claim 9 wherein said payload can be mapped to any of the following types: file system; block service; email application; database application.

16. The method of claim 9 wherein said network is a Chord network.

* * * * *